Patented Nov. 7, 1950

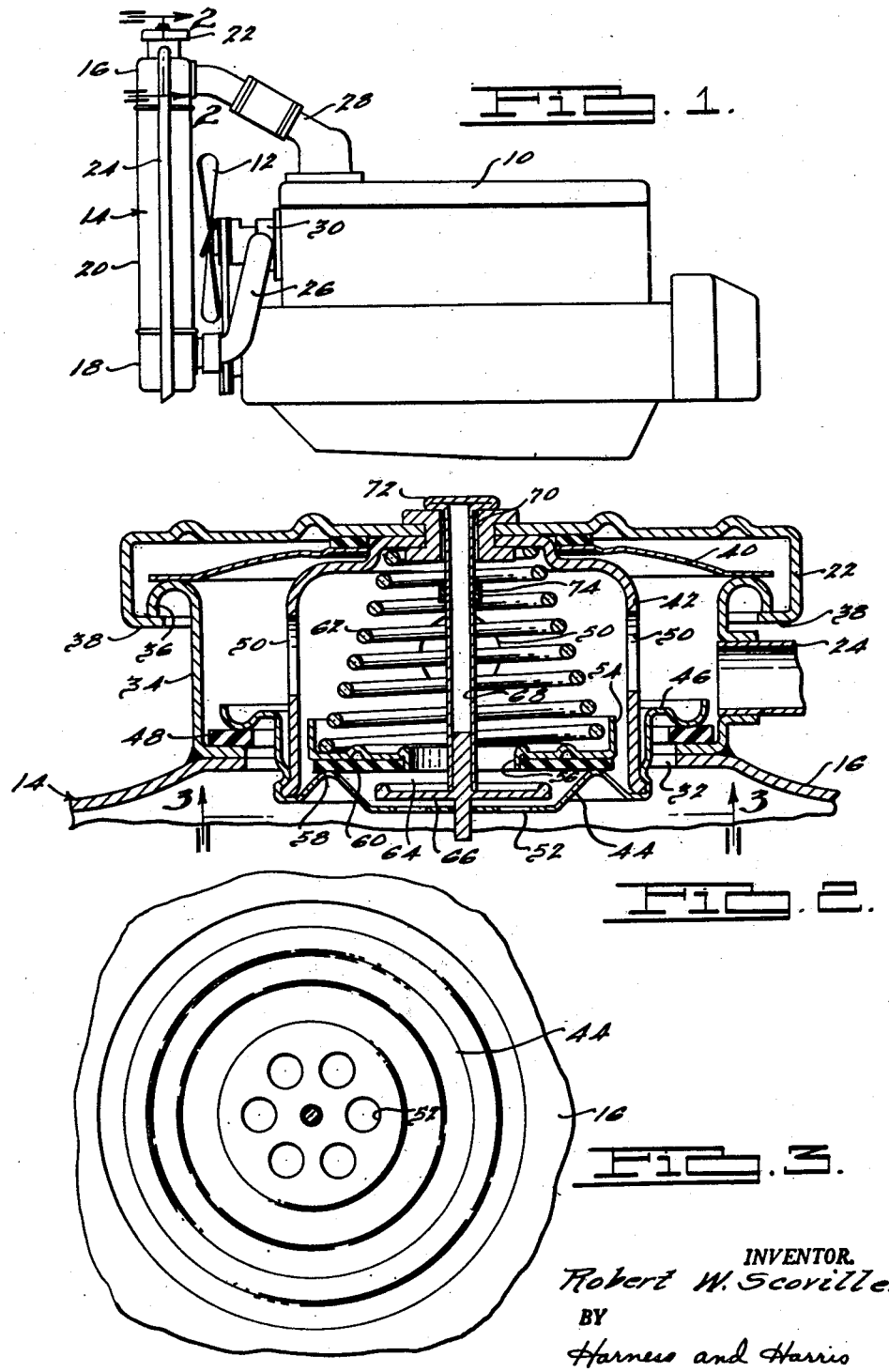

2,528,791

UNITED STATES PATENT OFFICE 2,528,791

PRESSURE CONTROL APPARATUS FOR ENGINE COOLING SYSTEMS

Robert W. Scoville, Detroit, Mich., assignor to Chrysler Corporation, Highland Park, Mich., a corporation of Delaware Application August 7, 1947, Serial No. 767,294

10 Claims. (Cl. 123—174)

This invention relates to cooling systems for liquid cooled engines and more particularly to pressure control apparatus therefor.

This invention will be described as associated with the engine of an automobile although it is to be understood that its application is not limited to automobile engines and that the apparatus may be associated with other engines if desired.

The most common method for cooling internal combustion engines involves the circulation of a liquid coolant through the block and head of the engine and through a radiator. Air is drawn through the radiator by a fan and by motion of the vehicle and heat from the liquid coolant is dissipated into the air. One refinement of this system which has been made in recent years involves the use of a sealed system adapted to operate under pressure. The pressure is created by vaporization of the liquid coolant. The increase in pressure raises the boiling point of the liquid and therefore raises the operating temperature at which a liquid may be maintained in an operating state within the system. The amount of heat which can be dissipated by a radiator is a function of the differential in temperature between the air and the temperature of the liquid in the system. Therefore, when a pressure system is used and the operating temperature of the liquid increased, the capacity of the radiator to dissipate heat is increased and the size of the radiator may be reduced. However, certain disadvantages are inherent in systems of this type. Repeated creation of pressure and relief of the pressure has a tendency to fatigue the metals and the metal soldered joints commonly used in radiator construction. When the cooling system is operated under pressure the bellows type thermostats controlling the circulation of liquid in the system have their performance altered. Pressure in the system also tends to create leaks in the radiator and hose connections. In addition, removal of the radiator cap of a system which is under pressure is dangerous in that the sudden removal of pressure from the system permits the liquid to flash to a boiling point thereby possibly scalding the operator.

It is an object of this invention to provide a system which operates under atmospheric pressure during normal operating conditions but which becomes a pressure system under extreme conditions when it is needed. It is needed when the temperature of the liquid in the cooling system becomes excessive for this indicates that the heat dissipation is inadequate.

Since the main purpose of having a pressure operated system is to increase the boiling point of the liquid coolant a principal object of this invention is to provide a control apparatus capable of permitting a cooling system to operate at atmospheric pressure until the boiling point of the coolant is reached. The control automatically creates a pressure system as soon as the liquid begins to boil and regardless of the temperature at which the particular liquid boils. Attention is invited to the fact that the effect of a pressure system upon the thermostat controlling the circulation of the liquid is irrelevant after the liquid is boiling for the thermostat is open anyway.

It is an additional object of the invention to provide a signal for the operator that a pressure condition exists in the system so that injury will not be caused to the operator by his removing the radiator cap under these conditions.

It is a further object of the invention to provide manual means so that the operator may dissipate the pressure in the system if desired.

It is also an object of the invention to provide means for relieving a condition of partial vacuum in the system when it is created by boiling and extreme pressure conditions followed by subsequent cooling of the system. The presence of a vacuum in the system is very undesirable for it has a tendency to permit atmospheric pressure to collapse radiator tanks and hoses commonly used in the system.

In the drawings Fig. 1 is a side elevation of an engine and liquid cooling system associated therewith;

Fig. 2 is a section taken on the line 2—2 of Fig. 1 showing a vertical section of a radiator cap, valving mechanism associated therewith and a portion of a radiator;

Fig. 3 is a view taken on the line 3—3 of Fig. 2.

The control mechanism will be described herein as installed in the radiator cap although the valves and associated apparatus used to control the system could be installed at any other convenient location in the system. Since the radiator cap is considered to be the most convenient location for these controls it has been chosen for use in the description thereof.

An engine 10, preferably associated with an automotive vehicle is provided with a fan 12 adapted to be driven by the engine. A radiator 14 of conventional construction is illustrated as positioned in proximity with the fan 12 and comprising an upper tank 16, a lower tank 18 and a connecting portion 20 which employs a plurality of liquid passages between the tanks 16 and 18 and a plurality of air passages therethrough. A removable cap 22 is provided on the radiator 14. Removal of the cap 22 facilitates the addition of water or other cooling liquid to the system. A conventional overflow tube 24 is associated with the radiator 14. Suitable tubular connecting means 26 and 28 are provided to connect the lower radiator tank and the upper radiator tank respectively to portions of the engine 10. A water pump 30 is provided in the tubular connection 26 and adapted to be driven by the engine so that liquid coolant is forced to circulate through the engine 10, tubular connection 28, tank 16, downwardly through portion 20 of the radiator, through lower tank 18 to be returned to the engine 10 through connection 26 and pump 30.

The upper tank 16 is illustrated in Fig. 2 as provided with an opening 32 and a neck portion 34 extending upwardly from the opening 32. The overflow tube 24 previously referred to penetrates the neck portion 34. The neck portion 34 is provided with downwardly extending lip portion 36 adapted to engage the radiator cap 22. The cap 22 is provided with inwardly extending flange portions 38 of conventional construction which are adapted to cooperate with the lip portion 36 to secure the cap to the neck portion 34 of the radiator tank. If desired a sealing element 40 may be secured to the cap 22 to cooperate with the upper surface of the neck portion 34 when the cap is assembled thereon.

The radiator and cap construction thus far described is conventional. The control embodying my invention is assembled therein. This control includes a housing 42 which is secured to the central portion of the cap and depends therefrom. The housing is substantially circular in shape. The lower portion of the housing is sealed by a base member 44 which is secured to the lower edge of the housing and is provided with a radiator engaging flange 46. The flange 46 is adapted to engage a sealing element such as a rubber washer 48 carried by the upper tank 16 in surrounding relationship with the opening 32. The housing 42 is provided with a plurality of openings 50 in the wall thereof. The openings 50 are adapted to provide a fluid flow connection between the interior of the housing 42 and the overflow tube 24. The base member 44 is provided with a plurality of openings 52 which are adapted to provide a fluid flow connection between the interior of the tank 16 and the interior of the housing 42 and the overflow tube 24. The base member 44 is provided with a plurality of openings 52 which are adapted to provide a fluid flow connection between the interior of the tank 16 and the interior of the housing 42. Valve means is associated with the openings 52 to control the admission of vapor from the tank 16 to the interior of the housing 42. A blow off valve plate 54 having a central aperture 56 is adapted to engage a ledge 58 provided in base member 44. The blow off valve plate 54 previously referred to has a sealing washer 60 secured to the lower face thereof for engagement with the ledge 58 of base member 44. A relatively stiff spring 62 is provided for keeping the blow off valve plate 54 and its washer 60 in sealing engagement with the ledge 58 of the base member 44 under normal operating conditions.

The contours of the base member 44 and the blow off valve plate 54 are such that an operating space 64 is provided therebetween. A supplemental valve plate 66 is provided for operation in the space 64. The supplemental valve plate 66 is preferably secured to a valve stem 68 which is slidably mounted in an opening 70 provided in the cap 22 so that vertical movement of the supplemental valve plate 66 is possible. Under normal operating conditions the weight of the supplemental valve plate 66 and the valve stem 68 will cause the plate 66 to assume its lowest position as illustrated in Fig. 2. A button 72 may be provided on the upper exterior portion of the valve stem 68 to limit the downward movement of the supplemental valve plate 66. With the valve plate 66 in the position illustrated in Fig. 2 the cooling system is in fluid flow connection with the atmosphere through openings 52, space 64, aperture 56, the interior of housing 42, openings 50 and overflow tube 24. However as soon as the liquid being circulated in the cooling system becomes hot enough to begin to boil the supplemental valve plate 66 will be raised into engagement with the sealing washer 60 to close aperture 56. The evaporation of liquid which occurs as an incident to boiling causes this lifting of the valve plate 66. The cooling system is then in condition to operate as a pressure system for the interior of the tank 16 is sealed from the atmosphere. The cooling system may continue to operate as a pressure system until a predetermined abnormal pressure is created therein. If this should occur the blow off valve plate 54 will be raised against the pressure of spring 62 to directly connect the space 64 and the interior of housing 42 so that the abnormal pressure within the cooling system may be readily dissipated through openings 50 and overflow tube 24.

While the system is operating as a pressure system it should be noted that the valve stem 68 and button 72 are raised. This is a visual signal to the operator that the system is under pressure and that he should not attempt to remove the cap 22. The button 72 and valve stem 68 also provide a manual means for the operator to relieve the pressure so that it will be safe for him to remove the cap 22. By depressing the button 72 the operator may manually lower the supplemental valve plate 66 and open the aperture 56 so that the pressure existing within the system may be relieved by openings 52, space 64, aperture 56, openings 50 and overflow tube 24.

A sealing flange 74 is preferably provided on the valve stem 68. The flange 74 is located on the valve stem so that it does not engage the stationary components associated with the cap 22 when the supplemental valve plate 66 is raised as an incident to boiling of the liquid. However, the sealing flange 74 is so located that under conditions when the blow off valve plate 54 is raised the sealing flange 74 will seal the opening 70 to prevent the discharge of vapor through the opening 70 to the compartment containing the engine 10. This constitutes a safety feature necessitated by the fact that alcohol vapor is combustible. It should not be permitted to escape into a compartment containing the heated engine 10.

It should be noted that the apparatus described above provides a cooling system adapted to operate under atmospheric pressure until the temperature of the system reaches the boiling point of the liquid being used in the system. The initial boiling of the liquid regardless of the temperature at which it occurs will automatically cause the apparatus to create a pressure cooling system thereby raising the boiling point of the liquid and permitting the engine to be operated with the liquid coolant at a higher temperature. This increases the temperature differential existing between the coolant and the air circulated by fan 12.

I claim:

1. Apparatus for regulating the pressure in the cooling system of a liquid engine having a radiator and an overflow tube associated therewith, said apparatus comprising means forming a vent for said system to the atmosphere through said overflow tube under normal engine operating conditions and a pressure responsive valve adapted to close said vent when liquid contained in said system begins to boil.

2. Apparatus for regulating the pressure in the cooling system of a liquid cooled engine having a radiator and an overflow tube associated therewith, said apparatus comprising means forming an atmospheric vent for said system through said overflow tube under normal engine operating conditions, a pressure responsive means adapted to close said vent at pressures between the pressure incident to boiling of the liquid contained in said system and a predetermined maximum pressure.

3. Apparatus for regulating the pressure in the cooling system of a liquid cooled engine comprising means forming an atmospheric vent for said system under normal engine operating conditions, a pressure responsive means adapted to close said vent at pressures between the pressure incident to boiling of the liquid contained in said system and a predetermined maximum pressure and manually controlled means to vent said system to the atmosphere.

4. Apparatus for regulating the pressure in the cooling system of a liquid cooled engine comprising means forming a vent for said system to the atmosphere under normal engine operating conditions, a pressure responsive valve adapted to close said vent when liquid contained in said system begins to boil and manually controlled means to open said valve.

5. In a motor vehicle having an engine compartment, a liquid cooled internal combustion engine located in said compartment, a cooling system for said engine and a pressure control apparatus for said cooling system comprising means forming a vent for said system to the atmosphere exteriorly of said engine compartment under normal engine operating conditions, valve means adapted to close said vent when a predetermined pressure is established in said system as an incident to boiling of said liquid and means adapted to relieve the pressure in said system when it exceeds an established maximum value.

6. A pressure control apparatus for the cooling system of a liquid cooled internal combustion engine having a heat exchange radiator provided with an inlet opening and an overflow tube, said apparatus being carried by a cap for said radiator inlet opening and comprising means forming an atmospheric vent for said system to said tube under normal engine operating conditions and a second means adapted to form a gas tight seal of said opening and said vent, said second means being operative to form said seal when the liquid in said system boils.

7. In a motor vehicle having an engine compartment, a liquid cooled internal combustion engine having a cooling system including a heat exchange radiator located in said compartment, a pressure control apparatus for said cooling system, said apparatus comprising means forming an atmospheric vent for said system to a location outside of said compartment under normal engine operating conditions, a second means adapted to form a gas tight seal of said vent, said second means being operative to form said seal when the liquid in said system boils and a third means adapted to form an atmospheric vent for said system when the pressure in said system exceeds a predetermined maximum.

8. A pressure control apparatus for the cooling system of a liquid cooled internal combustion engine having a heat exchange radiator provided with an inlet opening associated therewith, said apparatus being adapted to be carried by a cap for said radiator inlet opening and comprising means forming an atmospheric vent for said system under normal engine operating conditions, a pressure responsive valve adapted to be moved to a closed position when said liquid boils to thereby seal said vent and indicating means visible from the exterior of said cap to designate the position of said valve.

9. A pressure control apparatus for the cooling system of a liquid cooled internal combustion engine having a heat exchange radiator provided with an inlet opening associated therewith, said apparatus being adapted to be carried by a cap for said radiator inlet opening and comprising means forming an atmospheric vent for said system under normal engine operating conditions, a pressure responsive valve adapted to be moved to a closed position when said liquid boils to thereby seal said vent and manually operable means adapted to be operated while said cap is positioned in covering relation with respect to said inlet opening, said manually operable means being adapted when operated to vent the system to the atmosphere.

10. A cooling system for a liquid cooled internal combustion engine comprising a heat exchange radiator, means forming a path for the circulation of liquid through said engine and said radiator, a second means forming an atmospheric vent for said system under normal engine operating conditions, a third means adapted to form a gas tight seal for said vent, said third means being operative to form said seal when the liquid in said system boils, a fourth means adapted to form an atmospheric vent for said system when the pressure in said system exceeds a predetermined maximum and means adapted to convey all vapor vented by said system to a position remote from said engine whereby combustible vapors are not released in proximity with said engine.

ROBERT W. SCOVILLE.

REFERENCES CITED

The following references are of record in the file of this patent:

UNITED STATES PATENTS

| Number | Name | Date |
|---|---|---|
| 2,028,113 | Woodbridge | Jan. 14, 1936 |
| 2,139,395 | Walker | Dec. 6, 1938 |
| 2,195,266 | Bailey | Mar. 26, 1940 |
| 2,203,801 | Swank | June 11, 1940 |
| 2,415,475 | Eshbaugh | Feb. 11, 1947 |

Certificate of Correction

Patent No. 2,528,791

November 7, 1950

ROBERT W. SCOVILLE

It is hereby certified that error appears in the printed specification of the above numbered patent requiring correction as follows:

Column 5, line 10, after the word "liquid" insert *cooled*;

and that the said Letters Patent should be read as corrected above, so that the same may conform to the record of the case in the Patent Office.

Signed and sealed this 2nd day of January, A. D. 1951.

[SEAL]

THOMAS F. MURPHY,
*Assistant Commissioner of Patents.*